(12) United States Patent
Kim et al.

(10) Patent No.: US 11,014,244 B2
(45) Date of Patent: May 25, 2021

(54) ROBOT SYSTEM FOR ASSEMBLING COMPONENT AND CONTROL METHOD THEREOF

(71) Applicant: SUNGWOO HITECH CO., LTD., Busan (KR)

(72) Inventors: Jaekyun Kim, Busan (KR); Kwang Wook Jeong, Busan (KR); Byung Hag Park, Yongin-si (KR)

(73) Assignee: SUNGWOO HITECH CO., LTD., Busan (KR)

( * ) Notice: Subject to any disclaimer, the term of this patent is extended or adjusted under 35 U.S.C. 154(b) by 296 days.

(21) Appl. No.: 16/383,801

(22) Filed: Apr. 15, 2019

(65) Prior Publication Data
US 2020/0016759 A1 Jan. 16, 2020

(30) Foreign Application Priority Data

Jul. 10, 2018 (KR) .................. 10-2018-0079839
Jul. 10, 2018 (KR) .................. 10-2018-0079840
Jul. 10, 2018 (KR) .................. 10-2018-0079841

(51) Int. Cl.
*B25J 9/16* (2006.01)

(52) U.S. Cl.
CPC .......... *B25J 9/1697* (2013.01); *B25J 9/1635* (2013.01); *B25J 9/1661* (2013.01); *B25J 9/1676* (2013.01); *B25J 9/1679* (2013.01)

(58) Field of Classification Search
CPC . B25J 9/16; B25J 9/1697; B25J 9/1694; B25J 9/1692; B25J 9/1661; B25J 9/1656; B25J 9/1628; B25J 9/1635; B25J 9/1676; B25J 9/1674; B25J 9/1679; B25J 9/1682; G05B 2219/39; G05B 2219/39011; G05B 2219/39131; G05B 2219/40607; G05B 2219/40609; G05B 2219/40612; G05B 2219/37009; G05B 2219/37554
See application file for complete search history.

(56) References Cited

U.S. PATENT DOCUMENTS

| | | | |
|---|---|---|---|
| 5,148,591 A * | 9/1992 | Pryor | A01B 69/008 29/407.04 |
| 2014/0309762 A1* | 10/2014 | Hayata | B25J 9/1682 700/114 |

(Continued)

FOREIGN PATENT DOCUMENTS

| | | |
|---|---|---|
| DE | 69105867 | 4/1995 |
| DE | 102004021388 | 12/2005 |

(Continued)

*Primary Examiner* — Khoi H Tran
*Assistant Examiner* — Sarah A Tran
(74) *Attorney, Agent, or Firm* — Lex IP Meister, PLLC

(57) ABSTRACT

Disclosed are a robot system for assembling components and a control method thereof. The control method compares location coordinates of a robot in a vision coordinate system with location coordinates in a robot coordinate system and calculates a first correction value, calculates a second correction value from a difference between location coordinates of a correction tool and a component, and calculates a third correction value from location coordinates of components located at predetermined spaced locations and spacing coordinates, thereby precisely assembling components and performing inspection of the assembling.

19 Claims, 10 Drawing Sheets

(56) References Cited

U.S. PATENT DOCUMENTS

2017/0192415 A1 7/2017 Grant, Jr. et al.
2018/0059029 A1* 3/2018 Yeum ................. G01N 21/8806

FOREIGN PATENT DOCUMENTS

| DE | 102004049332 | 4/2006 |
|---|---|---|
| EP | 0470939 | 2/1992 |
| FR | 2 905 888 | 11/2008 |
| JP | 2017-035754 | 2/2017 |
| KR | 10-2017-0030392 | 3/2017 |
| KR | 10-2018-0072394 | 6/2018 |
| WO | 2008/031946 | 3/2008 |

* cited by examiner

ROBOT SYSTEM FOR ASSEMBLING COMPONENT AND CONTROL METHOD THEREOF

CROSS-REFERENCE TO RELATED APPLICATION

This application claims priority to and the benefit of Korean Patent Application Nos. 10-2018-0079839, 10-2018-0079840, and 10-2018-0079841 filed in the Korean Intellectual Property Office on Jul. 10, 2018, Jul. 10, 2018, and Jul. 10, 2018, the entire contents of which are incorporated herein by reference.

BACKGROUND OF THE INVENTION

(a) Field of the Invention

The present invention relates to a robot system for assembling components and a control method thereof, and more particularly, to a robot system for assembling components, which sets location coordinates of a plurality of robots and components disposed in a work space for assembling components through a virtual vision coordinate system recognized through a camera of a vision unit and automatically performs work, such as component restriction, location correction, component assembling, and product inspection, and a control method thereof.

(b) Description of the Related Art

In general, in order to assemble components in an industrial field, an assembling operation is performed by using a welding facility in the state where the components are restricted through an exclusive jig.

That is, in a process of assembling components, an operator seats each of the components on an exclusive jig and detects omission, a seating state, and the like of the component through a sensor and the like, and then a robot for welding puts a welding machine along a set route in the state where each of the components is fixed by a clamper to perform a welding operation.

However, in the related art, during the component assembling operation, the operator fixes the components on the fixed exclusive jigs and then the robot for welding puts the welding machine along the set route and performs the welding operation, so that there is a problem in that it fails to actively respond to molding tolerance of the components.

As described above, when a welding defect is generated between the components due to molding tolerance of the components, a mistake of an operator, and the like, reinforcement welding needs to be manually performed or there causes a problem in that a product is destroyed as a defective product.

In the meantime, the exclusive jig is manufactured by an exclusive facility of the corresponding components, so that the exclusive jig needs to be newly manufactured whenever a new model is developed, and thus there is a disadvantage in that jig manufacturing cost and facility investment cost of electric construction and the like are generated all the time The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a robot system for assembling components, which recognizes an operation space for assembling components through a virtual vision coordinate system recognized through a camera of a vision unit, and automatically performs work, such as component restriction, location correction, component assembling and welding, and product inspection, by using a plurality of hanger robots and one or more welding robots, and a control method thereof.

The present invention has also been made in an effort to provide a robot system for assembling components, which compares and analyzes three-point location coordinates of a correction tool of a hanger robot according to a minimum of three-point behavior of the hanger robot in a vision coordinate system and the corresponding three-point location coordinates in a robot coordinate system, and calculates a correction value for a difference values between the location coordinates and matches a robot coordinate system to a vision coordinate system, to enable a robot controller to accurately recognize a behavior location of the robot and accurately control the movement amount of a component, a rotation angle, and the like, and a control method thereof.

The present invention has also been made in an effort to provide a robot system for assembling components, which compares and analyzes location coordinates of a correction tool of a hanger robot recognized in a vision coordinate system and a component restricted by a hanger, and applies a correction value for a difference value between the location coordinates of the correction tool and the component to a robot coordinate system and corrects a robot coordinate system based on the component in the vision coordinate system, thereby minimizing a component restriction error according to repeated behavior of the robot, component molding tolerance, a transformation error according to welding of components, and the like, and a control method thereof.

The present invention has also been made in an effort to provide a robot system for assembling component, which makes components, which are matched to each other, be spaced apart from each other by a predetermined distance in an operation space, compares and analyzes location coordinates of each of the components in a vision coordinate system and a spacing coordinate value and predicts and determines interference between the components, and assembles the components in the state of avoiding interference between the components through the correction of the locations of the components, and a control method thereof.

An exemplary embodiment of the present invention provides a robot system for assembling components, the robot system including: a vision unit, which includes a frame installed in an operation space, in which components are assembled, a reference pin installed on the frame and serving as a coordinate reference, a plurality of linear rails installed on the frame, and a camera moving in six-axis directions including up, down, left, right, front, and rear directions and rotating through the plurality of linear rails, and scans the operation space by using the camera and transmits image information; one or more hanger robots, each of which includes an arm and a hanger mounted to a leading end of the arm and restricting a component, and is formed in a front side of the vision unit in the operation space; one or more welding robots, each of which includes an arm and a welding machine mounted to a leading end of the arm and welding components, and is formed in a rear side of the vision unit in the operation space; a vision controller, which sets the operation space as a virtual vision coordinate system based on the reference pin as the coordinate reference by using the image information received from the vision unit, performs calibration for correcting positions based on location coordinate values of the plurality of hanger robots and components in the vision coordinate system, and controls a location, a movement, and a posture of the camera; and a robot controller, which performs calibration for controlling behavior and postures of the one or more hanger robots and welding robots in the operation space based on a robot coordinate system set in the robot controller, and controls locations, movements, and postures of the one or more hanger robots and welding robots.

The one or more hanger robots may be formed of articulated robots controlled by driving of a plurality of servo motors.

The one or more welding robots may be formed of articulated robots controlled by driving of a plurality of servo motors.

The vision controller may be provided outside the operation space and store kinematical setting information of the vision unit for controlling the location of the camera.

The vision controller may include one or more processors utilizing a program and data for controlling the location of the camera.

The control of the location of the camera may include a plurality of movement points for sequentially moving the camera and one or more postures, which the camera takes at each movement point as an ideal theoretical value calculated based on the kinematical setting information of the vision unit.

The robot controller may be provided at one side of an external side of the operation space and store kinematical setting information for controlling postures of the one or more hanger robots and welding robots.

The robot controller may include one or more processors utilizing a program and data for controlling the postures of the one or more hanger robots and welding robots.

The control of the postures of the one or more hanger robots and welding robots may include a plurality of movement points for making the corresponding robot sequentially perform behavior and one or more postures, which the corresponding robot takes at each movement point, as an ideal theoretical value calculated based on the kinematical setting information of each robot.

The robot controller may include a control logic for controlling an operation of each hanger in the one or more hanger robots and an operation of the welding machine in the one or more welding robots.

Another exemplary embodiment of the present invention provides a method of controlling a robot system for assembling components, the method including: a first correction operation of generating three-point location coordinates in a vision coordinate system by scanning a location of a correction tool in a hanger robot according to three or more point behavior of the hanger robot by using the camera, comparing the three-point location coordinates in the vision coordinate system and corresponding three-point location coordinates in a robot coordinate system and calculating a correction value, and correcting the robot coordinate system with the correction value and matching the vision coordinate system and the robot coordinate system; a component restriction operation of gripping a component to be assembled through the hanger of the hanger robot and restricting the component to the hanger; a second correction operation of generating location coordinates of the correction tool and the component in the vision coordinate system by scanning the correction tool in the hanger robot and the component restricted by the hanger by using the camera of the vision unit, calculating a correction value calculated by a difference value between the location coordinates of the correction tool and the component, correcting the robot coordinate system corrected in the first correction operation again, and setting the robot coordinate system based on the component; a component spacing operation of applying a spacing coordinate value to another component assembled with one component among matched components and moving the one component and another component to locations, at which the one component is spaced apart from another component by a predetermined distance in the operation space by controlling the hanger robot; a third correction operation of scanning the one component and another component, which are spaced apart from each other by a predetermined distance in the operation space, by using the camera and generating location coordinates of the one component and another component in the vision coordinate system, comparing and analyzing the location coordinates of the one component and another component with the spacing coordinate value and predicting interference between the one component and another component, and matching the coordinates of the components in the vision coordinate system and the model coordinate system through the correction of the locations of the one component and another component; a component matching operation of inversely moving another component with respect to the one component by the spacing coordinate value in the operation space by controlling the hanger robot restricting another component and matching the one component and another component; a welding operation of welding welded parts of the one component and another component, which are matched to each other, by controlling the one or more welding robots and welding machines; and an inspection operation of comparing location coordinates in the vision coordinate system generated by scanning the product, in which the welded part is welded, by using the camera with model data coordinates in the model coordinate system and determining whether a difference between the location coordinates in the vision coordinate system and the model data coordinates is within an allowance error range, and inspecting a defect The first correction operation may include scanning the apex of the correction tool of the hanger robot according to three or more point behavior of the hanger robot in the operation space through the camera of the vision unit, generating, by the vision controller, three-point location coordinates of an apex of a correction tool in the vision coordinate system, comparing the corresponding three-point location coordinates of the apex of the correction tool in the robot coordinate system received from the robot controller and the three-point location coordinates in the vision coordinate system and calculating a first correction value for a difference value, and applying the first correction value to the robot coordinate system set in the robot controller, correcting the robot coordinate system to a first correction robot coordinate system, and setting the robot coordinate system as the first correction coordinate system.

The first correction operation may include: making, by the robot controller, the hanger robot perform three-point behavior to predetermined three-point locations in the operation space by controlling the hanger robot; scanning the apex of the correction tool fixed to a leading end of an arm of the hanger robot at the predetermined three-point locations according to the three-point behavior of the hanger robot through the camera of the vision unit and outputting image information; generating first, second, and third location coordinates of the apex of the correction tool in the vision coordinate system by analyzing the image information of the correction tool at the predetermined three-point locations of the hanger robot; receiving the first, second, and third location coordinates of the robot coordinate system for the apex of the correction tool at the predetermined three-point locations of the hanger robot from the robot controller; calculating the first correction value for difference values between first, second, and third location coordinate values in the robot coordinate system and the first, second, and third location coordinates in the vision coordinate system; and transmitting the first correction value to the robot controller, and correcting and setting the robot coordinate system to a first correction robot coordinate system.

The second correction operation may include scanning the apex of the correction tool of the hanger robot and one predetermined point of a component restricted by the hanger in the operation space by using the camera of the vision unit, generating, by the vision controller, location coordinates of the apex of the correction tool and the one predetermined point of the component in the vision coordinate system, calculating a second correction value for a difference value between the location coordinates of the apex and the location coordinates of the one predetermined point, and applying the second correction value to the robot coordinate system amended by the robot controller in the first correction operation and correcting and setting the robot coordinate system to a second correction robot coordinate system again.

The second correction robot coordinate system may be formed of a coordinate system, in which reference coordinates for controlling the hanger robot is shifted from a robot rotation center point (RRCP) that is the apex of the correction tool to a component rotation center point (PRCP) that is one predetermined point of the component.

The second correction operation may include: locating, by the robot controller, the component restricted by the hanger of the hanger robot at a setting location of the operation space by controlling the hanger robot; scanning the apex of the correction tool fixed to the leading end of the arm of the hanger robot and one predetermined point of the component restricted by the hanger in the operation space by using the camera of the vision unit and outputting image information; analyzing image information about the apex of the correction tool and generating first location coordinates which is a robot rotation center point (RRCP) in the vision coordinate system; analyzing image information about the one predetermined point of the component and generating second location coordinates which is a component rotation center point (PRCP) in the vision coordinate system; calculating a second correction value for a difference value between the first and second location coordinates in the vision coordinate system; and transmitting the second correction value to the robot controller and correcting and setting the robot coordinate system corrected in the first correction operation to the second correction robot coordinate system.

The third correction operation may include scanning the one component and another component, which are spaced apart from each other by a predetermined distance in the operation space, by using the camera of the vision unit, generating, by the vision controller, location coordinates of the one component and another component in the vision coordinate system, comparing and analyzing the location coordinates of the one component and another component with the spacing coordinate value and predicting interference between the one component and another component, calculating a third correction value for a coordinate interference value of the one component and another component, and applying the third correction value to the location coordinates of another component matched to the one component and correcting a location of another component.

The third correction operation may include: locating, by one hanger robot, the one component in the operation space in the vision coordinate system by using the model data coordinates in the model coordinate system set in a drawing program; locating, by another hanger robot, another component assembled to the one component in the operation space of the vision coordinate system by applying the spacing coordinate value of a location spaced by a predetermined distance in the model data coordinates in the model coordinate system set in the drawing program; scanning matching points of the one component and another component by using the camera of the vision unit and outputting image information; analyzing the image information about the matching points of the one component and another component and generating first and second location coordinates for the matching points in a spaced state in the vision coordinate system; comparing the first and second location coordinates in the vision coordinate system with the spacing coordinate value and calculating a coordinate interference value, and determining whether interference exists between the one component and another component by using the coordinate interference value; calculating a third correction value for the coordinate interference value when the interference is generated between the one component and another component; and transmitting the third correction value to the robot controller, and applying the third correction value to the location coordinates of another component in the robot coordinate system and correcting a location of another component in the operation space.

The model data coordinates may be formed of the coordinate value of a component model, in which the location coordinates of the reference pin are the reference coordinates, by inserting data of the reference pin, which is the coordinate reference in the vision coordinate system, to the model data of the component in the drawing program.

According to the exemplary embodiment of the present invention, it is possible to recognize an operation space for assembling components through a virtual vision coordinate system recognized through a camera of a vision unit, and automatically perform work, such as component restriction, location correction, component assembling and welding, and product inspection, in one process by using a plurality of hanger robots mounted with hangers and one or more welding robots mounted with welding machines.

That is, according to the exemplary embodiment of the present invention, the components are assembled by using the plurality of hanger robots and one or more welding robots in the operation space recognized as the vision coordinate system, so that equipment, such as a complex exclusive jig unit, is not required, it is possible to save electric work installation cost by assembling compatibility for various specifications of components, and it is not necessary to separately provide equipment, such as an inspection jig, for inspecting a defect of a product.

Further, according to the exemplary embodiment of the present invention, an apex of a correction tool of the hanger robot according to minimum three-point behavior of the hanger robot in the vision coordinate system is recognized with three-point location coordinates through the camera of the vision unit, corresponding three-point location coordinates in the robot coordinate system and the three-point location coordinates in the vision coordinate system are compared and analyzed to calculate a correction value for a difference value between the location coordinates, and the vision coordinate system is matched to the robot coordinate system by applying the correction value to an initial robot coordinate system, so that a robot controller may accurately recognize a behavior location of the robot in the operation space and accurately control the movement amount of a component, a rotation angle, and the like with the corrected coordinate value.

Further, according to the exemplary embodiment of the present invention, the correction tool of the hanger robot and a component restricted by each hanger are recognized with location coordinates in the vision coordinate system according to the camera of the vision unit, a correction value for a difference value between the location coordinates of the correction tool and the component is calculated, and the robot coordinate system is corrected based on the component in the vision coordinate system by applying the correction value to the robot coordinate system again, so that it is possible to minimize a component restriction error according to repeated behavior of the hanger robot, component molding tolerance, a transformation error according to welding of components, and the like.

In this case, the corrected robot coordinate system is the coordinate system, in which reference coordinates are shifted from a robot rotation center point (RRCP) that is one virtual point of the hanger robot serving as a center of rotation is shifted to a component rotation center point (PRCP) that is one virtual point in the component serving as a center of rotation of the component, and even when the component restricted by the hanger robot is transformed or a component, which is not completely the same as a predicted component, is restricted, it is possible to accurately calculate a rotation coordinate value of the component and it is easy to correct the coordinates of the component.

Further, according to the exemplary embodiment of the present invention, components, which are matched to each other, are spaced apart from each other by a predetermined distance in an operation space, location coordinates of each of the components in the vision coordinate system recognized through the camera of the vision unit and a spacing coordinate value are compared and analyzed, so that it is possible to predict and determine interference between the components and assemble the components in the state of avoiding interference between the components through the correction of the locations of the components.

Accordingly, it is possible to prevent a transformation distribution and a quality distribution of an assembled product generated due to forced assembling due to the interface between the components, and it is unnecessary to manufacture an exclusive inspection jig, thereby reducing jig manufacturing cost.

Other effects obtainable or expected through the exemplary embodiments of the present invention are directly or implicitly disclosed in the detailed description of the exemplary embodiments of the present invention. That is, various expected effects according to the exemplary embodiment of the present invention will be disclosed in the detailed description to be given below.

<Description of symbols>

Figure 1:
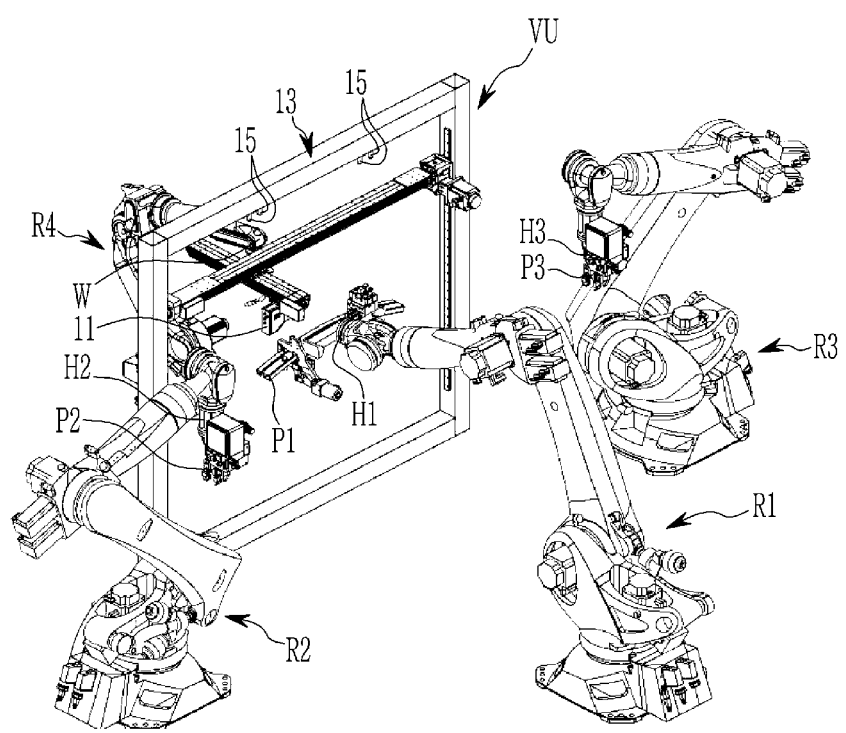
FIG. 1 is an entire diagram illustrating a robot system for assembling components according to an exemplary embodiment of the present invention.

| | |
|---|---|
| VU: Vision unit | |
| R1, R2, R3: First, second, third hanger robot | |
| R4: Welding robot | VC: Vision controller |
| RC: Robot controller | 11: Camera |
| 13: Frame | 13a: Pillar beam |
| 13b: Upper beam | 15: Reference pin |
| 21: Monitor | 31: Alarm device |
| 41: Connection shaft | 43: Guide rail |
| 45: Screw shaft | 51, 53: Elevating slider |
| 55: Decelerator | 57: Rotation plate |
| LR1, LR2: First, second linear rail | |
| SR1, SR2: First, second slider | |
| M1, M2: First, second motor | |
| P1, P2, P3: First, second, third component | |
| T: Correction tool | |
| H1, H2, H3: First, second, third hanger | |
| W: Welding machine | GB: Gear box |

DETAILED DESCRIPTION OF THE EMBODIMENTS

Hereinafter, configurations and operation principles of exemplary embodiments of a robot system for assembling components according to an exemplary embodiment of the present invention and a control method thereof will be described in detail through the accompanying drawings and detailed descriptions.

However, the drawings illustrated below and the detailed descriptions are related to one preferable exemplary embodiment among various exemplary embodiments for effectively describing a characteristic of the present invention, so that the present invention is not limited to the drawing and the descriptions below.

Further, in the description of the present invention, when a detailed description of a related publicly known function or configurations is determined to unnecessarily make the subject matter of the present invention unclear, the detailed description and a detailed illustration thereof will be omitted.

Further, terms described below are terms set in consideration of a function in the present invention, and may be changed according to an intension of a producer or a usual practice, so that the definitions thereof should be made based on the entire contents of the present specification.

Further, in the exemplary embodiment of the present invention below, in order to efficiently describe the essential technical characteristics of the present invention, terms may be appropriately modified, combined, or separated and used for making those skilled in the art clearly understand the present invention, but the present invention is not limited by the terms.

Further, a part irrelevant to the description is omitted for clarity of the exemplary embodiment of the present invention, and like reference numerals designate like elements throughout the specification, in a description below, names of constituent elements are discriminatingly used as "a first . . . ", a second . . . ", and the like, but this is for discriminating the same name of the constituent element, and the name of the constituent element is not limited to the order.

Figure 2:
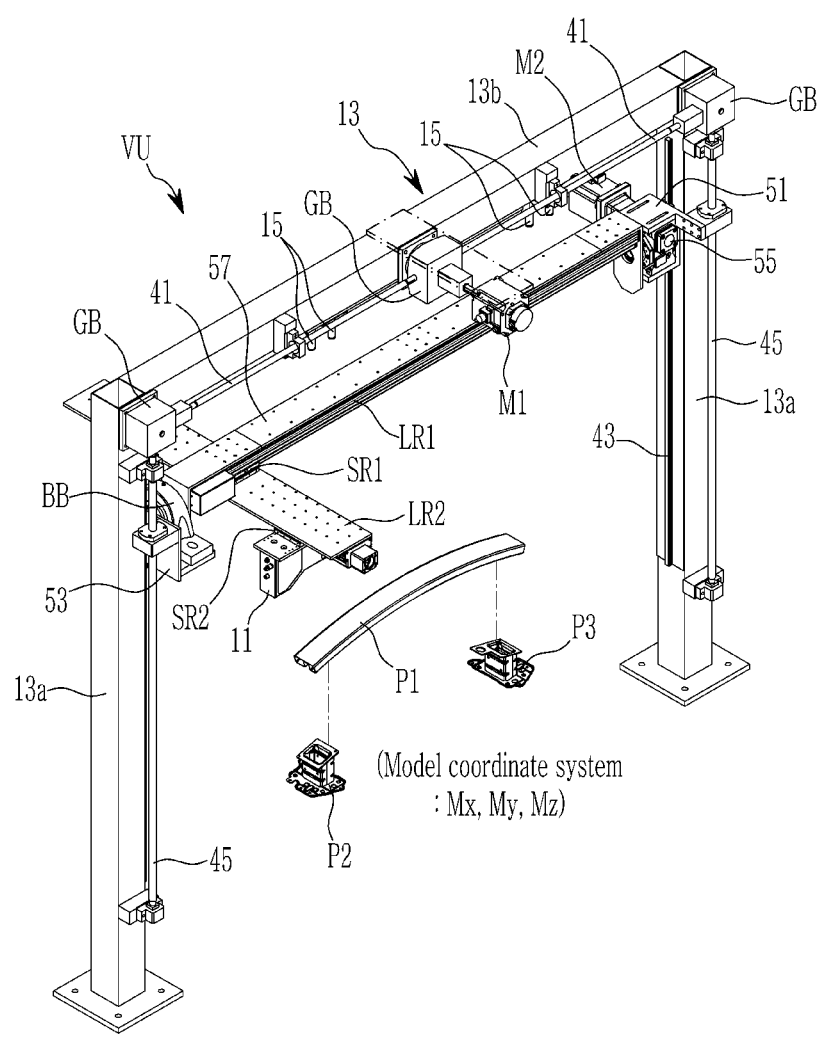
FIG. 2 is a perspective view of a vision unit applied to the robot system for assembling components according to the exemplary embodiment of the present invention.
Figure 3:
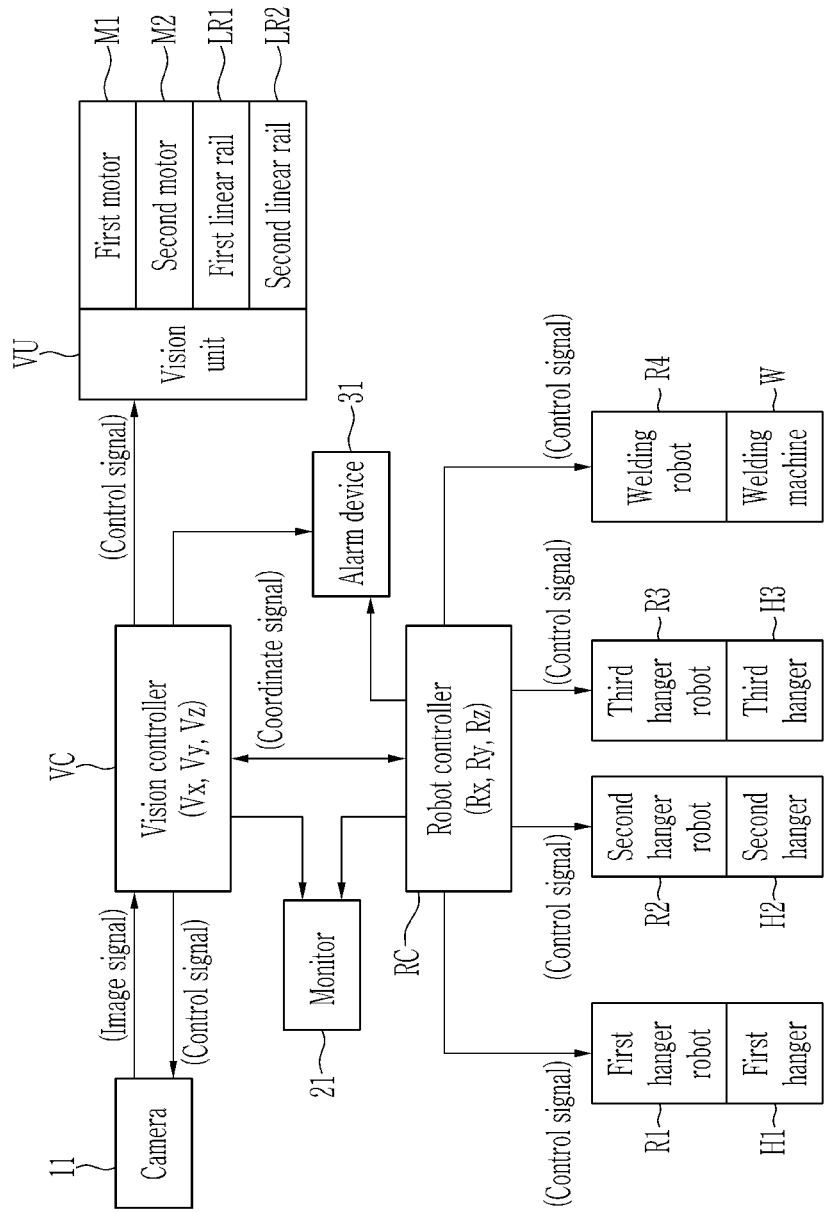
FIG. 3 is a control block diagram of the robot system for assembling components according to the exemplary embodiment of the present invention.

FIG. 1 is an entire diagram illustrating a robot system for assembling components according to an exemplary embodiment of the present invention, FIG. 2 is a perspective view of a vision unit applied to the robot system for assembling components according to the exemplary embodiment of the present invention, and FIG. 3 is a control block diagram of the robot system for assembling components according to the exemplary embodiment of the present invention.

Referring to FIGS. 1 to 3, a robot system for assembling components according to an exemplary embodiment of the present invention includes a vision unit VU installed within an operation space, in which components are assembled, three hanger robots R1, R2, and R3 including first, second, and third hanger robots R1, R2, and R3, and one welding robot R4, and includes a vision controller VC for controlling the vision unit VU and a robot controller RC for controlling the three hanger robots R1, R2, and R3 and the one welding robot R4.

The vision unit VU includes a frame 13 installed at one side of the operation space, a reference pin 15 formed at one side in the frame 13 to serve as a coordinate reference, a first linear rail LR1 movable in up and down directions with respect to the frame 13, a second linear rail LR2 movable in left and right directions on the first linear rail LR1, and a camera 11 movable in front and rear directions on the second linear rail LR2. The camera 11 may perform behavior in six-axial directions including, up, down, left, right, front, and rear directions by the movement of the first and second linear rails LR1 and LR2. Herein, the left and right directions refer to an x-axis direction, the front and rear directions refer to a y-axis direction, and the up and down directions refer to a z-axis direction.

In the frame 13, two pillar beams 13a formed of quadrangular beams are fixedly installed at both sides of the operation space in the X-axis, and the upper beam 13b is installed to connect upper ends of the both pillar beams 13a.

The frame 13 may additionally include a separate support beam for fixing both pillar beams 13a on a floor surface, but in the present specification, a description of the separate support beam is omitted.

The reference pins 15 are installed at both sides of a lower surface of the upper beam 13b, respectively, and a tip end of each reference pin 15 is precisely processed to be sharp. In the present exemplary embodiment, the case where the two reference pins 15 are installed at both sides of the lower surface of the upper beam 13b is exemplified, but the present invention is not limited thereto.

The first linear rail LR1 is disposed between the both pillar beams 13a, and is configured to be rotatable based on the x-axis while vertically (z-axis direction) moving along both pillar beams 13a through a driving means and a rotation means.

The driving means includes a first motor M1, both connection shafts 41, and a gear box GP. The first motor M1 is fixed to a center of a front surface of the upper beam 13b, and both connection shafts 41 are rotatably installed based on the x-axis at both sides of the front surface of the upper beam 13b, respectively, so that the both connection shafts 41 may transmit power to the driving shaft of the first motor M1 through the gear box GB installed at a center of the front surface of the upper beam 13b.

Further, both guide rails 43 are vertically (z-axis direction) formed on facing surfaces of the both pillar beams 13a, and both screw shafts 45 are vertically disposed on the front surfaces of both pillar beams 13a and are installed to be rotatable based on the z-axis.

Upper end portions of both screw shafts 45 are power-transmittably connected with end portions of both connection shafts 41, respectively, through the gear box GB installed on the front surfaces of the upper ends of both pillar beams 13a, respectively, to receive rotation power of the first motor M1.

Herein, the gear box GB means a box, in which various gears for changing a rotation direction of the rotation power of the first motor M1 by 90° and transmitting the rotation power are embedded. In this case, as the various gears applied to the inside of the gear box GB, a bevel gear or a worm gear, in a straight type, a curve type, a helical type, and a xeroll type, and a hypoid gear may be applied, but the present invention is not essentially limited thereto, and any gear set, which is capable of changing a rotation direction of rotation power of a motor by a set angle and transmitting the rotation power, is applicable.

Both elevating sliders 51 and 53, which are vertically movable along the guide rails 43 in the state of being tooth-engaged with the screw shafts 45, are formed in the guide rails 43 and the screw shafts 45 on both pillar beams 13a, respectively.

Herein, a second motor M2 including a decelerator 55 is installed on one elevating slider 51, and a bearing block BB is installed on the other elevating slider 53.

Further, a rotation plate 57 is installed at the decelerator 55 and the bearing block BB through both ends thereof between both elevating sliders 51 and 53. The rotation plate 57 receives the rotation power of the second motor M2, which is decelerated through the decelerator 55, and rotates 360° based on both elevating sliders 51 and 53.

Herein, the first linear rail LR1 is installed on the rotation plate 57 to rotate together with the rotation plate 57, and a first slider SR1, which is horizontally (x-axis direction) slidable, is provided on the first linear rail LR1.

A center portion of the second linear rail LR2 is installed on the first linear rail LR1 through the first slider SR1, and a second slider SR2, which is slidable in the front and rear directions (y-axis direction), is provided on the second linear rail LR2.

In this case, the second linear rail LR2 is installed on the first linear rail LR1 through the first slider SR1, so that the second linear rail LR2 rotates together with the rotation plate 57.

Herein, as the first and second linear rails LR1 and LR2, a general motor and a straight rail having a screw driving scheme may be applied, but the present invention is not essentially limited thereto, and a linear motor, which uses thrust generated by an interaction between a magnetic flux by a current supplied to a coil and a magnetic flux of a magnet, may be applied.

The camera 11 is installed on the second linear rail LR2 through the second slider SR2, and a 3D vision camera may be applied so as to obtain a 3D image for generating space coordinates of a subject.

The camera 11 is moved in the front and rear directions (y-axis direction) along the second linear rail LR2. Accordingly, the camera 11 photographs a subject while moving in the x-axis, y-axis, and z-axis directions by the movement of the first and second linear rails LR1 and LR2 and outputs image information.

That is, the vision unit VU recognizes a tip end of the reference pin 15 through the camera 11, and recognizes an operation space as the virtual vision coordinate system by using the recognized tip end as a reference coordinate (an origin coordinate), and recognizes subjects of the robots R1, R2, R3, the components P1, P2, P3, and the like positioned in the operation space by using the camera 11, and outputs image information, in which the reference pin 15 is the reference coordinate.

Further, the first, second, and third hanger robots R1, R2, and R3 are formed by installing hangers H1, H2, and H2 for restricting the components at leading ends of arms of articulated robots controlled by driving of a six-axis servo motor, and are disposed in a front portion of the vision unit VU in the operation space.

In the exemplary embodiment of the present invention, the number of hanger robots R1, R2, and R3 is limited to three, but two or four hanger robots may be included, and the number of hanger robots may be determined in a level, in which an efficient operation is possible, in consideration of the operation space and the number of assembled components.

Further, the welding robot R4 is formed by installing a welding machine W at a leading end of an arm of an articulated robot controlled by driving of a six-axis servo motor, and is disposed in a rear portion of the vision unit VU in the operation space.

In this case, the welding machine W is not limited by a welding scheme, such as an arc welding machine, a resistance welding machine, a friction stir welding machine, a self-piercing riveting bonding machine, and a laser welding machine, but the welding machine may be applied according to an efficient welding method in consideration of a welding characteristic of a component material, a structural characteristic of a welded part, operability in an operation space, and the like.

In the exemplary embodiment of the present invention, the number of welding robots R4 is limited to one, but two or three welding robots may be included, and the number of welding robots may be determined in a level, in which an efficient operation is possible, in consideration of the operation space, a welding method applied, and the like.

Further, in the exemplary embodiment of the present invention, it is limited that the articulated robot is controlled by the driving of the six-axis servo motor, but is not limited thereto, and the number of servo motors may be determined in a range, in which there is no affection to select positions of the components P1, P2, and P3 or the welding machine W.

Herein, the hanger robots R1, R2, and R3 and the welding robot R4 simply have the different names so as to be discriminated according to purpose of use, and may be formed of the same robot, and the general operations thereof are controlled by a control signal of the robot controller RC for controlling postures.

The vision controller VC is provided outside the operation space and stores general kinematical setting information of the vision unit VU for controlling a position of the camera 11, controls a general operation for controlling a position of the camera 11 so as to recognize the respective robots R1, R2, and R3 and the components P1, P2, and P3, and generates accurate location information on the operation space through image information of the respective robots R1, R2, and R3 and the components P1, P2, and P3 recognized through the camera 11 or sets a correction value through a coordinate correction.

The vision controller VC may be formed of one or more processors, which utilizes a program and data for controlling a position of the camera 11, and the control of the position of the camera 11 includes a plurality of movement points for sequentially moving the corresponding camera 11 and at least one posture, at which the camera 11 may take a posture, at each movement point, as ideal theoretical values calculated based on the kinematical setting information of the vision unit VU.

Further, the vision controller VC may set the operation space as the virtual vision coordinate system recognized through the camera 11 by using the reference pin 15 on the vision unit VU as the coordinate reference, perform calibration for correcting positions of the respective robots R1, R2, and R3 and the components P1, P2, and P3 based on coordinate values of the respective robots R1, R2, and R3 and the components P1, P2, and P3 positioned in the operation space in the vision coordinate system, and control at least one operation through a position of the camera 11, a movement of the camera 11 to a desired position, and the control of the posture of the camera 11.

Herein, the vision coordinate system (Vx, Vy, Vz) is a coordinate system indicating the operation space with virtual space coordinates based on one predetermined point within the operation space through the camera 11 of the vision unit VU by the vision controller VC, and the positions of the respective robots R1, R2, and R3 or the components P1, P2, and P3 recognized through the camera 11 within the operation space for assembling components may be indicated with space coordinates having an apex of the reference pin 15 as a reference.

The vision controller VC is a main controller formed of a plurality of processors, which utilizes a program and data for generally generating coordinates and correcting coordinates of the respective robots R1, R2, and R3 and the components P1, P2, and P3 in the operation space for assembling the components, and may be a programmable logic controller (PLC), a personal computer (PC), a workstation, and the like or may be controlled by a programmable logic controller (PLC), a personal computer (PC), a workstation, and the like.

The robot controller RC is provided outside the operation space and stores kinematical setting information for controlling a posture of the robot, and controls a general operation for controlling a posture of the robot for assembling the components and welding the components.

The robot controller RC may be formed of one or more processors, which utilize a program and data for controlling a posture of the robot, and the control of the posture of the robot includes a plurality of movement points for sequentially moving the corresponding robot and at least one posture, at which the robot may take a posture, at each movement point, as ideal theoretical values calculated based on the kinematical setting information of the robot.

Further, the robot controller RC may perform calibration for controlling the behavior and the postures of the respective robots R1, R2, R3, and R4 in the operation space based in the robot coordinate system, and control at least one operation through positions of the respective robots R1, R2, R3, and R4, the movement of the respective robots R1, R2, R3, and R4 to desired positions, and the control of the postures of the respective robots R1, R2, R3, and R4.

Herein, the robot coordinate system (Rx, Ry, Rz) is a unique coordinate system of a robot for recognizing the behavior of each of the hangers H1, H2, and H3 through the robot controller RC, and is defined by a coordinate system programmed in the robot controller RC, and may indicate a position of an apex of a correction tool (not illustrated) on the arm of the robot with space coordinates.

Further, the robot controller RC includes a control logic for controlling the operation of the hangers H1, H2, and H3 of the three hanger robots R1, R2, and R3 and an operation of the welding machine W of one welding robot R4.

In the meantime, in the exemplary embodiment of the present invention, a model coordinate system (Mx, My, Mz) is used, and the model coordinate system (Mx, My, Mz) is a coordinate system, which indicates a shape of a component model with space coordinates on a drawing program of each of the components P1, P2, and P3, and model data coordinates (that is, called "car-line coordinates"), in which the location coordinates of the reference pin 15 serve as the reference coordinates, may be generated by inserting the reference pin 15, which serves as the coordinate reference in the vision coordinate system, into model data on the drawing program, and be operated.

In the meantime, the robot system for assembling component according to the exemplary embodiment of the present invention may further include the monitor 21 and an alarm device 31.

The monitor 21 may display operation information and result information of the respective hanger robots R1, R2, and R3, the welding robot R4, and the like generated during the operation of the robot controller RC or the vision controller VC. That is, the monitor 21 may display image information photographed by the camera 11 of the vision unit VU and movement path information of the respective hanger robots R1, R2, and R3 and the welding robot R4 with coordinate values, and may display location information and the like of the respective components P1, P2, and P3 within the operation space with coordinate values.

Further, the monitor 21 may display defect information with characters and the like under the control of the robot controller RC and the vision controller VC.

As long as the monitor 21 is capable of display the operation information, the result information, and the like, the kind of monitors is irrelevant. For example, the monitor 21 may also be one of a liquid crystal display (LCD), an organic light emitting display (OLED), an electrophoretic display (EPD), and a light emitting diode (LED) display device.

Further, the alarm device 31 outputs defect information of the components P1, P2, and P3 under the control of the robot controller RC or the vision controller VC, and herein, the defect information may represent information for notifying an operator of the generation of the defect in the components P1, P2, and P3 or a product, and for example, the defect information may be formed of a voice, graphic, light, and the like.

Hereinafter, a control method of the vision controller VC and the robot controller RC for assembling the plurality of components P1, P2, and P3 with each other in the operation space through the robot system for assembling components having the foregoing configuration will be described.

Figure 4:
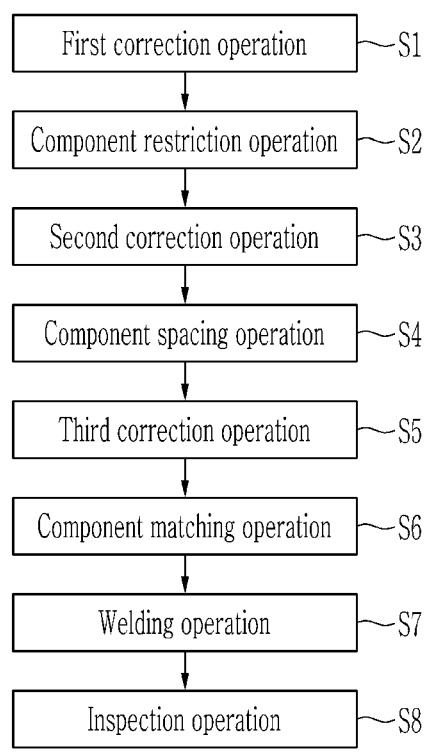
FIG. 4 is a process diagram according to a method of controlling the robot system for assembling components according to an exemplary embodiment of the present invention.

FIG. 4 is a flow chart of the control of the robot system for assembling components according to an exemplary embodiment of the present invention.

Referring to FIG. 4, a method of controlling the robot system for assembling components according to an exemplary embodiment of the present invention includes a first correction operation S1, a component restriction operation S2, a second correction operation S3, a component spacing operation S4, a third correction operation S5, a component matching operation S6, a welding operation S7, and an inspection operation S8, and operations S1 to S8 are sequentially progressed.

Operations S1 to S8 will be described based on the robot controller RC, and the vision controller VC communicating with the robot controller RC.

First, in the first correction operation S1, each of the first, second, and third hanger robots R1, R2, and R3 performs three-point behavior in the operation space under the control of the robot controller RC. During the movement, an apex of a correction tool T of each of the first, second, and third hanger robots R1, R2, and R3 is scanned through the camera 11 of the vision unit VU under the control of the vision controller VC, and the vision controller VC generates coordinates of the apex of each correction tool T by three-point location coordinates (Vx, Vy, Vz) in the vision coordinate system.

The vision controller VC compares location coordinates (Rx, Ry, Rz) of three corresponding points in the robot coordinate system for the apex of the correction tool T received from the robot controller RC with location coordinates (Vx, Vy, Vz) of three points in the vision coordinate system, and calculates a first correction value that is a correction coordinate value for a difference value between the location coordinates in the robot coordinate system and the location coordinates in the vision coordinate system.

The vision controller VC transmits the first correction value to the robot controller RC, and applies the first correction value to the robot coordinate system set in the robot controller RC to correct the robot coordinate system to a first correction robot coordinate system.

Through the first correction operation S1, the robot coordinate system set in the robot controller RC as the unique coordinate system is corrected with the first correction value to be matched to the vision coordinate system.

Figure 5:
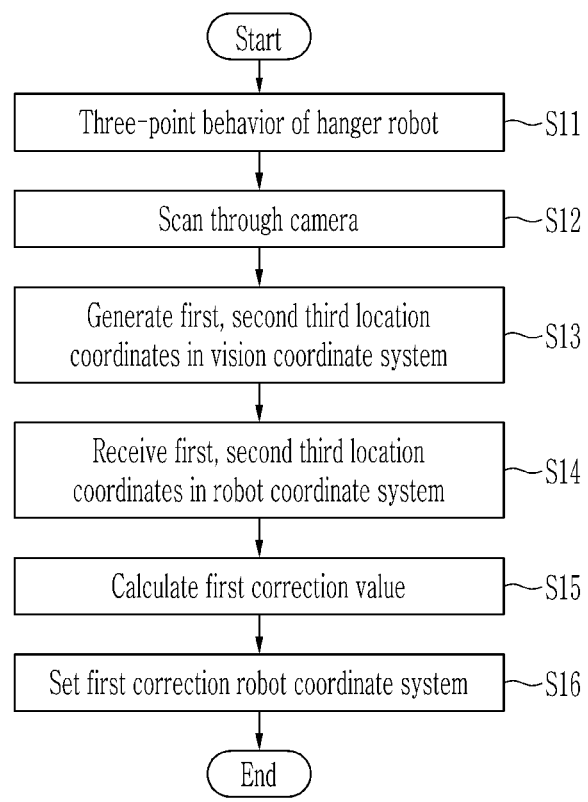
FIG. 5 is a control flow diagram of a first correction operation S1 according to the method of controlling the robot system for assembling components according to an exemplary embodiment of the present invention.
Figure 6:
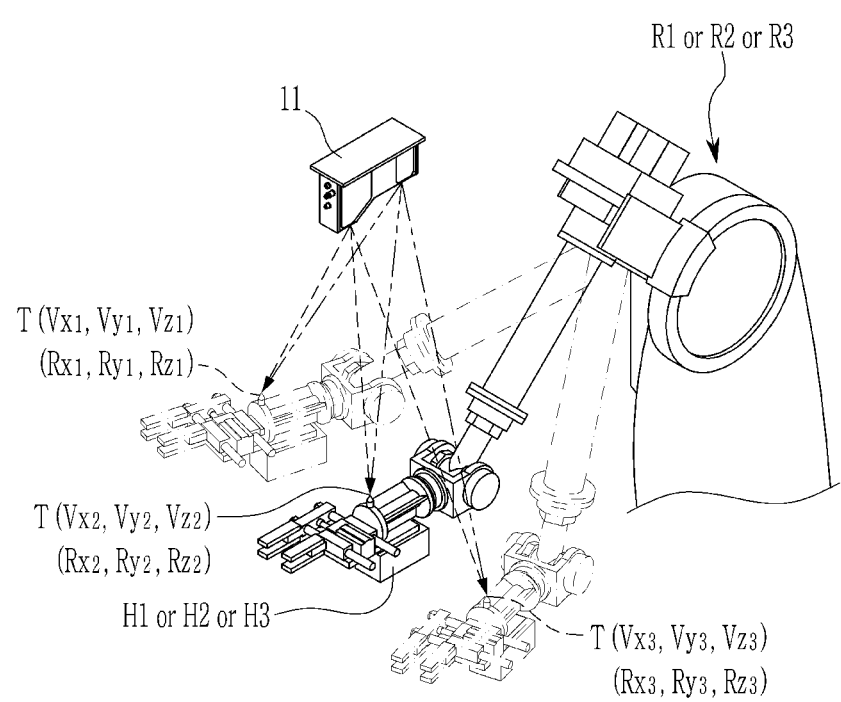
FIG. 6 is a diagram of an example of the first correction operation S1 according to the method of controlling the robot system for assembling components according to an exemplary embodiment of the present invention.

FIG. 5 is a control flow diagram of the first correction operation S1 according to the method of controlling the robot system for assembling components according to the exemplary embodiment of the present invention, and FIG. 6 is a diagram of an example of the first correction operation S1 according to the method of controlling the robot system for assembling components according to the exemplary embodiment of the present invention.

The first correction operation S1 will be described in more detail with reference to FIGS. 5 and 6.

The first correction operation S1 is initiated by moving the first, second, ad third hanger robots R1, R2, and R3 to three locations (S11). That is, in operation S11, the robot controller RC makes the first, second, and third robots R1, R2, and R3 perform three-point behavior to three predetermined locations in the operation space by sequentially controlling the first, second, and third robots R1, R2, and R3.

In this case, the vision controller VC scans an apex of the correction tool T fixed to the leading end of the arm of each of the first, second, and third hanger robots R1, R2, and R3 at the three predetermined locations according to the three-point behavior of the first, second, and third robots R1, R2, and R3 through the camera 11 and outputs image information by controlling the vision unit VU (S12).

Next, the vision controller VC analyzes the image information of the correction tools T at the three predetermined three-point locations of the first, second, and third hanger robots R1, R2, and R3 and generates first, second and third location coordinates (Vx, Vy, Vz) of the apexes of the correction tools T in the vision coordinate system (S13).

In this case, the first, second and third location coordinates (Vx, Vy, Vz) in the vision coordinate system includes $(Vx_1, Vy_1, Vz_1)$, $(Vx_2, Vy_2, Vz_2)$, and $(Vx_3, Vy_3, Vz_3)$. That is, the location coordinates in the vision coordinate system may be generated in the form of the 3D coordinates that are 3D space coordinates.

Further, the vision controller VC receives first, second, and third location coordinates (Rx, Ry, Rz) of the apexes of the correction tools T in the robot coordinate system at the three predetermined three-point locations of the first, second, and third hanger robots R1, R2, and R3 from the robot controller RC (S14).

In this case, the first, second, and third location coordinates (Rx, Ry, Rz) in the robot coordinate system includes $(Rx_1, Ry_1, Rz_1)$, $(Rx_2, Ry_2, Rz_2)$, and $(Rx_3, Ry_3, Rz_3)$. That is, the location coordinates in the robot coordinate system may be generated in the form of the 3D coordinates that are 3D space coordinates.

Herein, the predetermined locations of the first, second, and third hanger robots R1, R2, and R3 are limited to three points, but this is for the purpose of generating the first, second, and third location coordinates (Vx, Vy, Vz) in the vision coordinate system and the first, second, and third location coordinates (Rx, Ry, Rz) in the robot coordinate system in the form of the 3D coordinates that are the 3D space coordinates, respectively. Accordingly, the predetermined locations of the first, second, and third hanger robots R1, R2, and R3 are not limited to three points, and when it is necessary to generate the reliable 3D coordinates, the first, second, and third hanger robots R1, R2, and R3 may be moved to the locations of three or more points.

Then, the vision controller VC compares the values of the first, second, and third location coordinates (Rx, Ry, Rz) in the robot coordinate system with the values of the first, second, and third location coordinates (Vx, Vy, Vz) in the vision coordinate system, and calculates a first correction value that is a correction coordinate value for a difference value between the location coordinates in the robot coordinate system and the location coordinates in the vision coordinate system (S15).

The vision controller VC transmits the first correction value to the robot controller RC, and the robot controller RC applies the first correction value to the robot coordinate system to correct the robot coordinate system to a first correction robot coordinate system and sets the robot coordinate system again (S16).

Referring back to FIG. 4, the first correction robot coordinate system is set through the first correction operation S1 and then the component restriction operation S2 is performed. In the component restriction operation S2, as illustrated in FIG. 1, the robot controller RC grips and restricts the first, second, and third components P1, P2, and P3 by controlling the first, second, and third hanger robots R1, R2, and R3, and the first, second, and third hangers H1, H2, and H3 of the first, second, and third hanger robots R1, R2, and R3. Herein, the first, second, and third components P1, P2, and P3 are the components to be assembled.

In the component restriction operation S2, after the first, second, and third components P1, P2, and P3 are restricted, the second correction operation S3 is performed. In the second correction operation S3, the apex of the correction tool T of each of the first, second, and third hanger robots R1, R2, and R3 in the operation space and one predetermined point D of each of the components P1, P2, and P3 restricted by the first, second, and third hangers H1, H2, and H3 are scanned through the camera 11 of the vision unit VU under the control of the vision controller VC, and the vision controller VC generates location coordinates (Vxt, Vyt, Vzt) and (Vxd, Vyd, Vzd) of the apex of each correction tool T and the one predetermined point D of each of the components P1, P2, and P3 in the vision coordinate system.

The vision controller VC calculates a second correction value that is a correction coordinate value for a difference value between the location coordinates (Vxt, Vyt, Vzt) and (Vxd, Vyd, Vzd).

The vision controller VC transmits the second correction value to the robot controller RC, and the robot controller RC applies the second correction value to the first correction robot coordinate system corrected in the first correction operation S1 and corrects the first correction robot coordinate system to a second correction robot coordinate system again.

In the second correction operation S3, the robot coordinate system for the behavior of the first, second, and third hanger robots R1, R2, and R3 is corrected with the second correction value to make the hanger robots R1, R2, and R3 perform behavior based on the components P1, P2, and P3, respectively.

Herein, the second correction robot coordinate system means a coordinate system, in which reference coordinates for controlling each of the first, second, and third hanger robots R1, R2, and R3 are shifted from a robot rotation center point (RRCP) that is the apex of each correction tool T to a component rotation center point (PRCP) that is one predetermined point D in the corresponding component P1, P2, and P3.

Figure 7:
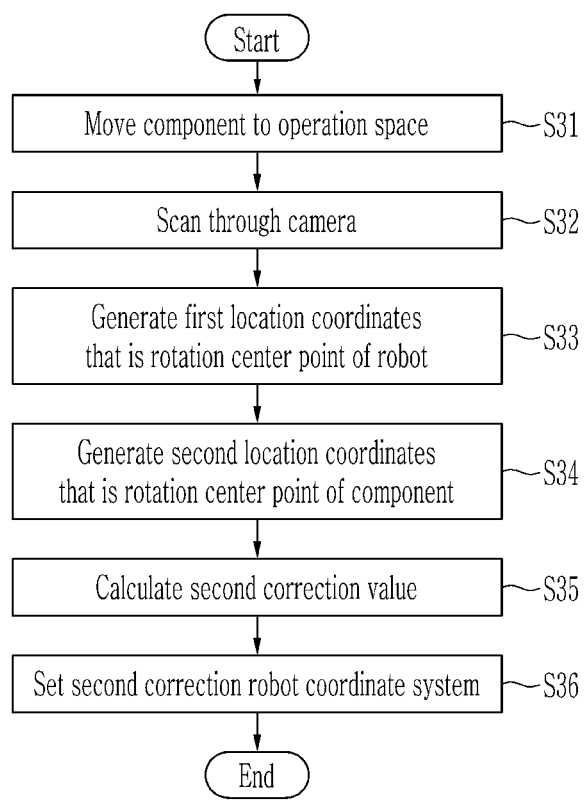
FIG. 7 is a control flow diagram of a second correction operation S3 according to the method of controlling the robot system for assembling components according to an exemplary embodiment of the present invention.
Figure 8:
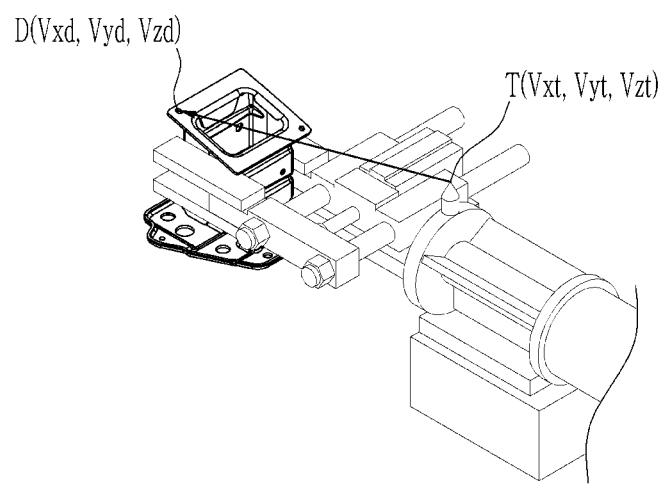
FIG. 8 is a diagram of an example of the second correction operation S3 according to the method of controlling the robot system for assembling components according to an exemplary embodiment of the present invention.

FIG. 7 is a control flow diagram of the second correction operation S3 according to the method of controlling the robot system for assembling components according to the exemplary embodiment of the present invention, and FIG. 8 is a diagram of an example of the second correction operation S3 according to the method of controlling the robot system for assembling components according to the exemplary embodiment of the present invention.

The second correction operation S3 will be described in more detail with reference to FIGS. 7 and 8.

The second correction operation S3 is initiated by locating the components P1, P2, and P3 to set locations in the operation space (S31). That is, in operation S31, the robot controller RC locates the components P1, P2, and P3 restricted by the first, second, and third hangers H1, H2, and H3 to set locations in the operation space by controlling the first, second, and third hanger robots R1, R2, and R3.

The vision controller VC scans an apex of the correction tool T fixed to the leading end of the arm of each of the first, second, and third hanger robots R1, R2, and R3 and one predetermined point D of each of the components P1, P2, and P3 restricted by the first, second, and third hangers H1, H2, and H3 in the operation space through the camera 11 and outputs image information by controlling the vision unit VU (S32).

The vision controller VC analyzes the image information for the apex of each correction tool T and generates first location coordinates (Vxt, Vyt, Vzt) of each of the components, which is the robot rotation center point (RRCP) in the vision coordinate system (S33).

In this case, the first location coordinates (Vxt, Vyt, Vzt) in the vision coordinate system include $(Vxt_1, Vyt_1, Vzt_1)$, $(Vxt_2, Vyt_2, Vzt_2)$, and $(Vxt_3, Vyt_3, Vzt_3)$. That is, the first location coordinates in the vision coordinate system may be generated in the form of the 3D coordinates that are 3D space coordinates.

Next, the vision controller VC analyzes the image information about the one predetermined point of each of the components P1, P2, and P3 and generates second location coordinates (Vxd, Vyd, Vzd) of each of the components P1, P2, and P3, which is the rotation center point (PRCP of each component in the vision coordinate system (S34).

In this case, the second location coordinates (Vxd, Vyd, Vzd) in the vision coordinate system include $(Vxd_1, Vyd_1, Vzd_1)$, $(Vxd_2, Vyd_2, Vzd_2)$, and $(Vxd_3, Vyd_3, Vzd_3)$. That is, the second location coordinates in the vision coordinate system may be generated in the form of the 3D coordinates that are 3D space coordinates.

Then, the vision controller VC calculates a second correction value that is a correction coordinate value for a difference value between the first and second location coordinates (Vxt, Vyt, Vzt) and (Vxd, Vyd, Vzd) in the vision coordinate system (S35).

The vision controller VC transmits the second correction value to the robot controller RC, and the robot controller RC corrects the first correction robot coordinate system corrected in the first correction operation S1 to a second correction robot coordinate system to set the robot coordinate system again (S36).

Referring back to FIG. 4, the second correction robot coordinate system is set through the second correction operation S2 and then the component spacing operation S4 is performed. In the component spacing operation S4, the robot controller RC applies spacing coordinate values to the second and third components P2 and P3 matched to the first component P1 and moves the second and third components P2 and P3 to a location spaced apart from the first component P1 by a predetermined space in the operation space by controlling the first, second, and third hanger robots R1, R2, and R3.

In the component spacing operation S4, after the first, second, and third components P1, P2, and P3 are located, the third correction operation S5 is performed. In the third correction operation S5, the first component P1 and the second and third components P2 and P3, which are spaced apart from the first component P1 by the predetermined space in the operation space are scanned through the camera 11 of the vision unit VU under the control of the vision controller VC, and the vision controller VC generates the location coordinates (Vx, Vy, Vz) of each of the first, second, and third components P1, P2, and P3 in the vision coordinate system.

The vision controller VC compares and analyzes values of the location coordinates (Vx, Vy, Vz) and the spacing coordinates (Dx, Dy, Dz) and predicts interference of the second and third components P2 and P3 for the first component P1, and calculates a third correction value that is a correction coordinate value for coordinate interference values of the second and third components P2 and P3 for the first component P1.

The vision controller VC transmits the third correction value to the robot controller RC, and the robot controller RC applies the third correction value to the location coordinates (Vx, Vy, Vz) of the second and third components P2 and P3 matched to the first component P1 to correct the locations of the second and third components P2 and P3 with respect to the first component P1.

In the third correction operation S5, the second and third components P2 and P3 matched to the first component P1 are spaced apart from the first component P1 by the predetermined space in the operation space, interference between the components P1, P2, and P3 is predicted by using the location coordinates (Vx, Vy, Vz) in the vision coordinate system, and there performs a location correction of matching the location coordinates (Vx, Vy, Vz) and (Mx, My, Mz) for each of the components P1, P2, and P3 in the vision coordinate system and the model coordinate system.

Figure 9:
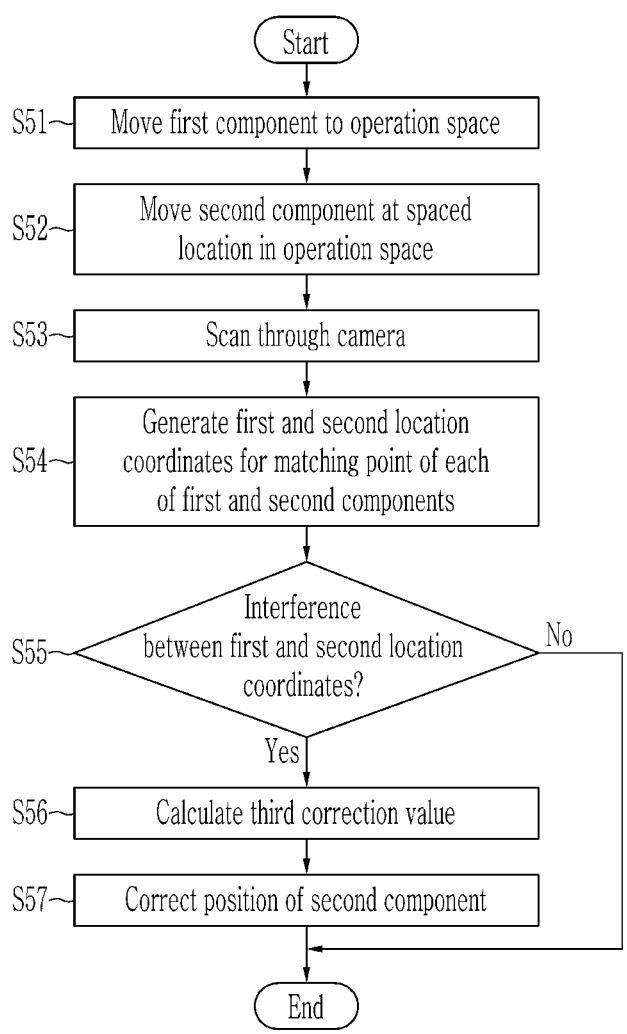
FIG. 9 is a control flow diagram of a third correction operation S5 according to the method of controlling the robot system for assembling components according to an exemplary embodiment of the present invention.
Figure 10:
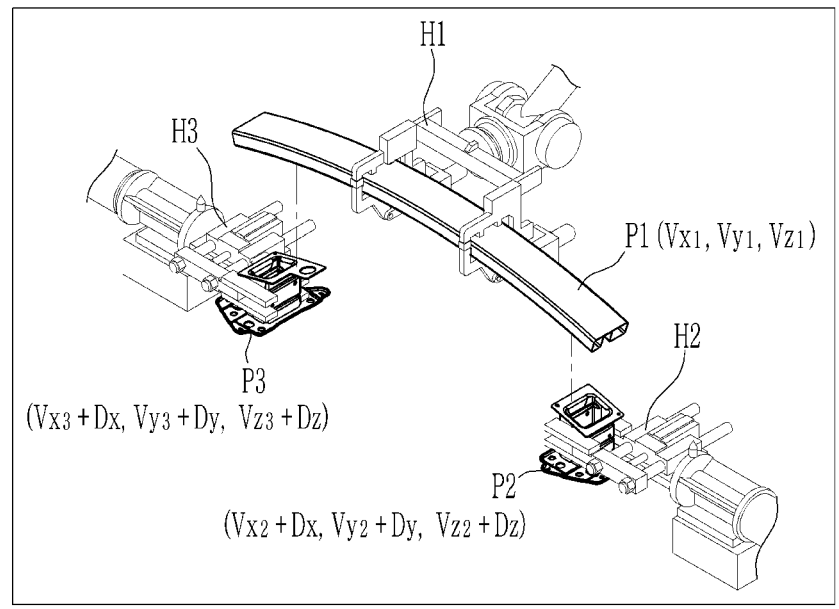
FIG. 10 is a diagram of an example of the third correction operation S5 according to the method of controlling the robot system for assembling components according to an exemplary embodiment of the present invention.
Figure 10:
Figure 10:
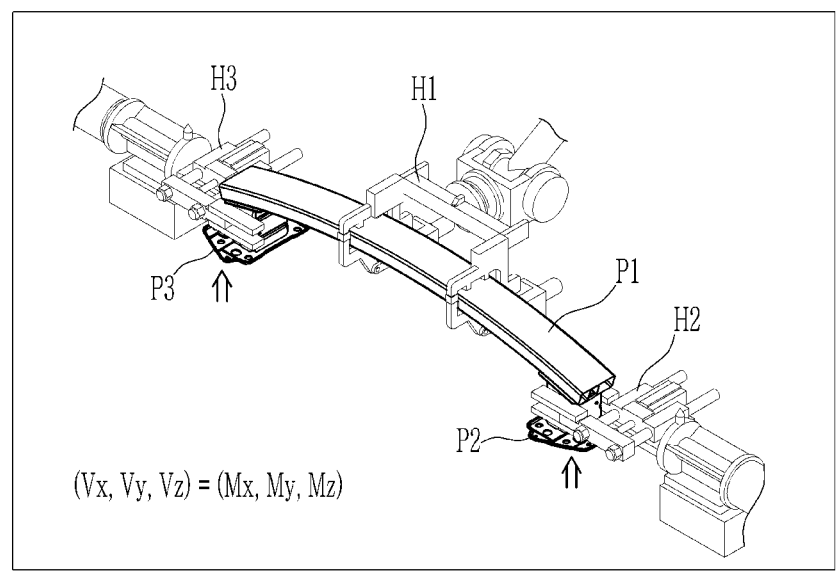

FIG. 9 is a control flow diagram of the third correction operation S5 according to the method of controlling the robot system for assembling components according to the exemplary embodiment of the present invention, and FIG. 10 is a diagram of an example of the third correction operation S5 according to the method of controlling the robot system for assembling components according to the exemplary embodiment of the present invention.

The third correction operation S5 will be described in more detail with reference to FIGS. 9 and 10.

The third correction operation S5 is initiated by locating the first component P1 in the operation space (S51). That is, in operation S51, the robot controller RC locates the first component P1 in the operation space in the vision coordinate system by using the model data coordinates (Mx, My, Mz) in the model coordinate system set in a drawing program by controlling the first hanger robot R1.

Next, the robot controller RC locates the second and third components P2 and P3 assembled with the first component P1 at the spaced location in the operation space in the vision coordinate system by controlling the second and third hanger robots R2 and R3 (S52). In this case, the locations of the second and third components P2 and P3 are calculated by using values of the spacing coordinates (Dx, Dy, Dz) of the locations spaced apart from the model data coordinates (Mx, My, Mz) by the predetermined distance in the model coordinate system set in the drawing program.

Then, the vision controller VC scans matching points of the first component P1, and the second and third components P2 and P3 matched to the first component P1 through the camera 11 and outputs image information by controlling the vision unit VU (S53).

The vision controller VC analyzes the image information for the matching points of the first, second, and third components P1, P2, and P3 and generates first, second, and third location coordinates (Vx, Vy, Vz) for the matching points in the spaced state in the vision coordinate system (S54).

In this case, the first, second and third location coordinates (Vx, Vy, Vz) in the vision coordinate system includes $(Vx_1, Vy_1, Vz_1)$, $(Vx_2, Vy_2, Vz_2)$, and $(Vx_3, Vy_3, Vz_3)$. That is, the first, second, and third location coordinates in the vision coordinate system may be generated in the form of the 3D coordinates that are 3D space coordinates.

Next, the vision controller VC compares the first, second, and third location coordinates (Vx, Vy, Vz) in the vision coordinate system with the values of the spacing coordinates (Dx, Dy, Dz) to calculate a coordinate interference value, and determines the interference of the second and third components P2 and P3 on the first component P1 by using the coordinate interference value (S55).

In this case, the vision controller VC calculates a third correction value of the corresponding components P2 and P3 as the correction coordinate value for the coordinate interference value when the interference of the second component P2 or the third component P3 on the first component P1 is generated (S56).

The vision controller VC transmits the third correction value to the robot controller RC, and the robot controller RC applies the corresponding third correction value to the location coordinates (Rx, Ry, Rz) in the robot coordinate system of the second component P2 or the third component P3 interfering the first component P1, and corrects the location of the component P2 or P3 interfering the first component P1 in the operation space (S57).

In the third correction operation S5, the model data coordinates (Mx, My, Mz) may be formed of the coordinate values of the component model, in which the location coordinates of the reference pin 15 are the reference coordinates, by inserting data of the reference pin 15, which is the coordinate reference in the vision coordinate system, to the model data of the first, second, and third components P1, P2, and P3 in the drawing program.

Referring back to FIG. 4, the location of the component P2 or P3 interfering the first component P1 in the operation space is corrected through the third correction operation S3, and then the component matching operation S6 is performed. In the component matching operation S6, the robot controller RC inversely shifts the second and third components P2 and P3 with respect to the first component P1 by the values of the spacing coordinates (Dx, Dy, Dz) in the operation space by controlling the second and third hanger robots R2 and R3 restricting the second and third components P2 and P3, and matches the first, second, and third components P1, P2, and P3 to one another in the respective matching points.

Then, in the welding operation S7, the robot controller RC welds welding parts of each of the first, second, and third components P1, P2, and P3, which are matched with one another, and assembles the first, second, and third components P1, P2, and P3 by controlling the welding robot R4 and the welding machine W.

Then, in the inspection operation S8, when the vision controller VC scans the welding part of each of the first, second, and third components P1, P2, and P3 by using the camera 11 and outputs image information by controlling the vision unit VU, the vision controller VC compares the location coordinates (Vx, Vy, Vz) in the vision coordinate system for the product with the model data coordinates (Mx, My, Mz) in the model coordinate system and determines whether a difference value between the location coordinates in the vision coordinate system and the model data coordinates in the mode coordinate system is present within an allowable error range to perform a defect inspection.

Accordingly, the robot system for assembling components and the control method thereof according to the exemplary embodiment of the present invention may automatically restrict the plurality of components P1, P2, and P3 to be assembled, assemble the components P1, P2, and P3 through welding in the state where the location of the plurality of components P1, P2, and P3 is corrected, and inspect the assembled product in the operation space recognized as the vision coordinate system by the vision unit VU, so that an assembling operation including various operations may be performed at one time without a disconnection.

That is, the robot system for assembling components and the control method thereof according to the exemplary embodiment of the present invention performs the assembling operation of the components P1, P2, and P3 by using the first, second, and third hanger robots R1, R2, and R3 and the welding robot R4 in the operation space recognized as the vision coordinate system, so that equipment, such as a complex exclusive jig unit, is not required and there is compatibility for various specifications of components, thereby saving equipment cost for building exclusive equipment for assembling. Further, it is not necessary to separately include equipment, such as an inspection jig, for inspecting a defect of a product.

Further, in the related art, at the time of the initial installation, even though the vision units VU and the robots are installed at the accurate locations by minimizing dislocation between the equipment by using an ink-line, a laser leveler, or the like, a coordinate system distortion is generated in the vision unit VU and the robots, so that there is a problem in that the movement coordinates of the robot is different from the recognition coordinates of the vision unit VU. In order to solve the problem, the correction operation is performed several times, so that there is a problem in that productivity deteriorates.

However, the robot system for assembling components and the control method thereof according to the exemplary embodiment of the present invention may enable the robot controller RC to accurately recognize the behavior locations of the hanger robots R1, R2, and R3 in the operation space in the vision coordinate system by matching the vision coordinate system and the robot coordinate system through the first correction operation S1, and may accurately control the movement amounts, rotation angles, and the like of the components P1, P2, and P3 with the corrected coordinate values.

Further, in the related art, when the component is restricted and transferred through the hanger robot, the reference coordinates of the robot are set to one point of the robot and the robot coordinate system is formed by manually teaching the reference coordinates. Accordingly, when a component is changed or a component, which is not completely the same as a predicted component, is restricted, it is impossible to detect the component and correct the coordinates of the component to cause a welding defect due to a matching error between the components.

However, the robot system for assembling components and the control method thereof according to the exemplary embodiment of the present invention may control each of the hanger robots R1, R2, and R3 through the second correction robot coordinate system corrected based on the components P1, P2, and P3 in the vision coordinate system through the second correction operation S3, thereby minimizing a component restriction error according to the repeated behavior of each of the hanger robots R1, R2, and R3, molding tolerance of the components P1, P2, and P3, transformation error according to the welding of the components P1, P2, and P3, and the like. Further, even when the components P1, P2, and P3 restricted by the hangers H1, H2, and H3 of the hanger robots R1, R2, ad R3, respectively are transformed or the component, which is not the same as the predicted component, is restricted, it is possible to accurately calculate rotation coordinate values and it is easy to correct a coordinate value through the second correction robot coordinate system.

Further, in the related art, when the components P1, P2, and P3, which are assembled with each other, are shifted in the operation space based on the model data coordinates (Mx, My, Mz) in the drawing program, interference between the components P1, P2, and P3 is generated and thus it is impossible to recognize whether a problem is generated in a quality of the component or a distribution generated at the time of transferring the robot, so that it is impossible to continuously produce the product having the same quality.

However, the robot system for assembling components and the control method thereof according to the exemplary embodiment of the present invention may predict and determine interference between the components P1, P2, and P3 with the location coordinate values recognized through the camera 11 of the vision unit VU at the positions, at which the components P1, P2, and P3, which are matched to one another, are spaced apart from one another by predetermined distances in the operation space, thereby welding the components P1, P2, and P3 in the state of avoiding the interference between the components P1, P2, and P3 through the correction of the locations of the components.

Accordingly, it is possible to prevent a transformation distribution and a quality distribution of an assembled product generated due to forced assembling due to the interference between the components P1, P2, and P3, and it is unnecessary to manufacture the exclusive inspection jig, thereby reducing jig manufacturing cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A robot system for assembling components, the robot system comprising:
   a vision unit, which includes a frame installed in an operation space, in which components are assembled, a reference pin installed on the frame and serving as a coordinate reference, a plurality of linear rails installed on the frame, and a camera moving in six-axis directions including up, down, left, right, front, and rear directions and rotating through the plurality of linear rails, and scans the operation space by using the camera and transmits image information;
   one or more hanger robots, each of which includes an arm and a hanger mounted to a leading end of the arm and restricting a component, and is formed in a front side of the vision unit in the operation space;
   one or more welding robots, each of which includes an arm and a welding machine mounted to a leading end of the arm and welding components, and is formed in a rear side of the vision unit in the operation space;
   a vision controller, which sets the operation space as a virtual vision coordinate system based on the reference pin as the coordinate reference by using the image information received from the vision unit, performs calibration for correcting positions based on location coordinate values of the plurality of hanger robots and components in the vision coordinate system, and controls a location, a movement, and a posture of the camera; and
   a robot controller, which performs calibration for controlling behavior and postures of the one or more hanger robots and welding robots in the operation space based on a robot coordinate system set in the robot controller, and controls locations, movements, and postures of the one or more hanger robots and welding robots.

2. The robot system of claim 1, wherein:
   the one or more hanger robots are formed of articulated robots controlled by driving of a plurality of servo motors.

3. The robot system of claim 1, wherein:
   the one or more welding robots are formed of articulated robots controlled by driving of a plurality of servo motors.

4. The robot system of claim 1, wherein:
   the vision controller is provided outside the operation space and stores kinematical setting information of the vision unit for controlling the location of the camera.

5. The robot system of claim 1, wherein:
   the vision controller includes one or more processors utilizing a program and data for controlling the location of the camera.

6. The robot system of claim 5, wherein:
   the control of the location of the camera includes a plurality of movement points for sequentially moving the camera and one or more postures, which the camera takes at each movement point as an ideal theoretical value calculated based on the kinematical setting information of the vision unit.

7. The robot system of claim 1, wherein:
   the robot controller is provided at one side of an external side of the operation space and stores kinematical setting information for controlling postures of the one or more hanger robots and welding robots.

8. The robot system of claim 1, wherein:
   the robot controller includes one or more processors utilizing a program and data for controlling the postures of the one or more hanger robots and welding robots.

9. The robot system of claim 1, wherein:
   the control of the postures of the one or more hanger robots and welding robots includes a plurality of movement points for making the corresponding robot sequentially perform behavior and one or more postures, which the corresponding robot takes at each movement point, as an ideal theoretical value calculated based on the kinematical setting information of each robot.

10. The robot system of claim 1, wherein:
    the robot controller includes a control logic for controlling an operation of each hanger in the one or more hanger robots and an operation of the welding machine in the one or more welding robots.

11. A method of controlling a robot system for assembling components, the robot system including a vision unit including a camera, one or more hanger robots, each of which includes a hanger, one or more welding robots, each of which includes a welding machine, a vision controller, and a robot controller, the method comprising:
    a first correction operation of generating three-point location coordinates in a vision coordinate system by scanning a location of a correction tool in a hanger robot according to three or more point behavior of the hanger robot by using the camera, comparing the three-point location coordinates in the vision coordinate system and corresponding three-point location coordinates in a robot coordinate system and calculating a correction value, and correcting the robot coordinate system with the correction value and matching the vision coordinate system and the robot coordinate system;

a component restriction operation of gripping a component to be assembled through the hanger of the hanger robot and restricting the component to the hanger;

a second correction operation of generating location coordinates of the correction tool and the component in the vision coordinate system by scanning the correction tool in the hanger robot and the component restricted by the hanger by using the camera of the vision unit, calculating a correction value calculated by a difference value between the location coordinates of the correction tool and the component, correcting the robot coordinate system corrected in the first correction operation again, and setting the robot coordinate system based on the component;

a component spacing operation of applying a spacing coordinate value to another component assembled with one component among matched components and moving the one component and another component to locations, at which the one component is spaced apart from another component by a predetermined distance in the operation space by controlling the hanger robot;

a third correction operation of scanning the one component and another component, which are spaced apart from each other by a predetermined distance in the operation space, by using the camera and generating location coordinates of the one component and another component in the vision coordinate system, comparing and analyzing the location coordinates of the one component and another component with the spacing coordinate value and predicting interference between the one component and another component, and matching the coordinates of the components in the vision coordinate system and the model coordinate system through the correction of the locations of the one component and another component;

a component matching operation of inversely moving another component with respect to the one component by the spacing coordinate value in the operation space by controlling the hanger robot restricting another component and matching the one component and another component;

a welding operation of welding welded parts of the one component and another component, which are matched to each other, by controlling the one or more welding robots and welding machines; and an inspection operation of comparing location coordinates in the vision coordinate system generated by scanning the product, in which the welded part is welded, by using the camera with model data coordinates in the model coordinate system and determining whether a difference between the location coordinates in the vision coordinate system and the model data coordinates is within an allowance error range, and inspecting a defect.

12. The method of claim 11, wherein:

the first correction operation includes scanning the apex of the correction tool of the hanger robot according to three or more point behavior of the hanger robot in the operation space through the camera of the vision unit, generating, by the vision controller, three-point location coordinates of an apex of a correction tool in the vision coordinate system, comparing the corresponding three-point location coordinates of the apex of the correction tool in the robot coordinate system received from the robot controller and the three-point location coordinates in the vision coordinate system and calculating a first correction value for a difference value, and applying the first correction value to the robot coordinate system set in the robot controller, correcting the robot coordinate system to a first correction robot coordinate system, and setting the robot coordinate system as the first correction coordinate system.

13. The method of claim 12, wherein:

the first correction operation includes:

making, by the robot controller, the hanger robot perform three-point behavior to predetermined three-point locations in the operation space by controlling the hanger robot;

scanning the apex of the correction tool fixed to a leading end of an arm of the hanger robot at the predetermined three-point locations according to the three-point behavior of the hanger robot through the camera of the vision unit and outputting image information;

generating first, second, and third location coordinates of the apex of the correction tool in the vision coordinate system by analyzing the image information of the correction tool at the predetermined three-point locations of the hanger robot;

receiving the first, second, and third location coordinates of the robot coordinate system for the apex of the correction tool at the predetermined three-point locations of the hanger robot from the robot controller;

calculating the first correction value for difference values between first, second, and third location coordinate values in the robot coordinate system and the first, second, and third location coordinates in the vision coordinate system; and transmitting the first correction value to the robot controller, and correcting and setting the robot coordinate system to a first correction robot coordinate system.

14. The method of claim 11, wherein:

the second correction operation includes scanning the apex of the correction tool of the hanger robot and one predetermined point of a component restricted by the hanger in the operation space by using the camera of the vision unit, generating, by the vision controller, location coordinates of the apex of the correction tool and the one predetermined point of the component in the vision coordinate system, calculating a second correction value for a difference value between the location coordinates of the apex and the location coordinates of the one predetermined point, and applying the second correction value to the robot coordinate system amended by the robot controller in the first correction operation and correcting and setting the robot coordinate system to a second correction robot coordinate system again.

15. The method of claim 14, wherein:

the second correction robot coordinate system is formed of a coordinate system, in which reference coordinates for controlling the hanger robot are shifted from a robot rotation center point (RRCP) that is the apex of the correction tool to a component rotation center point (PRCP) that is one predetermined point of the component.

16. The method of claim 14, wherein:

the second correction operation includes:

locating, by the robot controller, the component restricted by the hanger of the hanger robot at a setting location of the operation space by controlling the hanger robot;

scanning the apex of the correction tool fixed to the leading end of the arm of the hanger robot and one predetermined point of the component restricted by the hanger in the operation space by using the camera of the vision unit and outputting image information;

analyzing image information about the apex of the correction tool and generating first location coordinates which is a robot rotation center point (RRCP) in the vision coordinate system;

analyzing image information about the one predetermined point of the component and generating second location coordinates which is a component rotation center point (PRCP) in the vision coordinate system;

calculating a second correction value for a difference value between the first and second location coordinates in the vision coordinate system; and transmitting the second correction value to the robot controller and correcting and setting the robot coordinate system corrected in the first correction operation to the second correction robot coordinate system.

17. The method of claim 11, wherein:

the third correction operation includes scanning the one component and another component, which are spaced apart from each other by a predetermined distance in the operation space, by using the camera of the vision unit, generating, by the vision controller, location coordinates of the one component and another component in the vision coordinate system, comparing and analyzing the location coordinates of the one component and another component with the spacing coordinate value and predicting interference between the one component and another component, calculating a third correction value for a coordinate interference value of the one component and another component, and applying the third correction value to the location coordinates of another component matched to the one component and correcting a location of another component.

18. The method of claim 17, wherein:

the third correction operation includes:

locating, by one hanger robot, the one component in the operation space in the vision coordinate system by using the model data coordinates in the model coordinate system set in a drawing program;

locating, by another hanger robot, another component assembled to the one component in the operation space of the vision coordinate system by applying the spacing coordinate value of a location spaced by a predetermined distance in the model data coordinates in the model coordinate system set in the drawing program;

scanning matching points of the one component and another component by using the camera of the vision unit and outputting image information;

analyzing the image information about the matching points of the one component and another component and generating first and second location coordinates for the matching points in a spaced state in the vision coordinate system;

comparing the first and second location coordinates in the vision coordinate system with the spacing coordinate value and calculating a coordinate interference value, and determining whether interference exists between the one component and another component by using the coordinate interference value;

calculating a third correction value for the coordinate interference value when the interference is generated between the one component and another component; and transmitting the third correction value to the robot controller, and applying the third correction value to the location coordinates of another component in the robot coordinate system and correcting a location of another component in the operation space.

19. The method of claim 18, wherein:

the model data coordinates are formed of the coordinate value of a component model, in which the location coordinates of the reference pin are the reference coordinates, by inserting data of the reference pin, which is the coordinate reference in the vision coordinate system, to the model data of the component in the drawing program.

* * * * *